(12) United States Patent
Ploemen et al.

(10) Patent No.: US 9,222,029 B2
(45) Date of Patent: Dec. 29, 2015

(54) METHOD FOR EXTRACTING BITUMEN FROM AN OIL SAND FEED STREAM

(75) Inventors: Ingmar Hubertus Josephina Ploemen, Amsterdam (NL); Ronald Jan Schoonebeek, Amsterdam (NL); Bernardus Cornelis Maria In't Veen, Amsterdam (NL)

(73) Assignee: Shell Oil Company, Houston, TX (US)

( * ) Notice: Subject to any disclaimer, the term of this patent is extended or adjusted under 35 U.S.C. 154(b) by 207 days.

(21) Appl. No.: 13/424,515

(22) Filed: Mar. 20, 2012

(65) Prior Publication Data

US 2013/0068664 A1   Mar. 21, 2013

(30) Foreign Application Priority Data

Mar. 21, 2011   (CA) ...................................... 2734439

(51) Int. Cl.
*C10G 1/04* (2006.01)
*B01D 21/02* (2006.01)

(52) U.S. Cl.
CPC *C10G 1/04* (2013.01); *C10G 1/045* (2013.01); *B01D 21/02* (2013.01); *C10G 2300/4012* (2013.01); *C10G 2300/4081* (2013.01); *C10G 2300/44* (2013.01); *C10G 2400/02* (2013.01)

(58) Field of Classification Search
CPC .................................. C10G 1/04; C10G 1/045
USPC .......................................................... 208/390
See application file for complete search history.

(56) References Cited

U.S. PATENT DOCUMENTS

| | | |
|---|---|---|
| 3,475,318 A | 10/1969 | Gable et al. ...................... 208/11 |
| 4,160,718 A * | 7/1979 | Rendall .......................... 208/390 |
| 2008/0210602 A1* | 9/2008 | Duyvesteyn .................. 208/390 |
| 2009/0301937 A1 | 12/2009 | Duyvesteyn et al. ......... 208/390 |
| 2011/0127197 A1* | 6/2011 | Blackbourn et al. .......... 208/390 |
| 2011/0226672 A1* | 9/2011 | Peuker .......................... 208/390 |

* cited by examiner

*Primary Examiner* — Brian McCaig

(57) ABSTRACT

The present invention is a method for extracting bitumen from an oil sand feed stream including at least the steps of: (a) providing an oil sand feed stream; (b) contacting the oil sand feed stream with a liquid comprising an aliphatic hydrocarbon solvent thereby obtaining a solvent-diluted oil sand slurry; (c) depositing the solvent-diluted oil sand slurry as a filter cake on a filter medium and filtering the solvent-diluted oil sand slurry, thereby obtaining a solids-enriched stream and a filtrate, wherein during the filtering the pressure above the filter cake is at least 1.7 bara; and (d) lowering the pressure of the solids-enriched stream to below 1.2 bara.

17 Claims, 2 Drawing Sheets

METHOD FOR EXTRACTING BITUMEN FROM AN OIL SAND FEED STREAM

CROSS REFERENCE TO EARLIER APPLICATIONS

The present application claims priority to Canadian application No. 2734439, filed on 21 Mar. 2011, which is incorporated herein by reference.

FIELD OF THE INVENTION

The present invention relates to a method for extracting bitumen from an oil sand.

BACKGROUND OF THE INVENTION

Various methods have been proposed in the past for the recovery of bitumen (sometimes referred to as "tar" or "bituminous material") from oil sands as found in various locations throughout the world and in particular in Canada such as in the Athabasca district in Alberta and in the United States such as in the Utah oil sands. Typically, oil sand (also known as "bituminous sand" or "tar sand") comprises a mixture of bitumen (in this context also known as "crude bitumen", a semi-solid form of crude oil; also known as "extremely heavy crude oil"), sand, clay minerals and water. Usually, oil sand contains about 5 to 25 wt. % bitumen (as meant according to the present invention), about 1 to 13 wt. % water, the remainder being sand and clay minerals.

As an example, it has been proposed and practiced at commercial scale to recover the bitumen content from the oil sand by mixing the oil sand with water and separating the sand from the aqueous phase of the slurry formed.

Disadvantages of such aqueous extraction processes are the need for extremely large quantities of process water (typically drawn from natural sources) and issues with removing the bitumen from the aqueous phase (whilst emulsions are being formed) and removing water from the bitumen-depleted sand.

Other methods have proposed non-aqueous extraction processes to reduce the need for large quantities of process water. An example of such a non-aqueous extraction process is disclosed in e.g. U.S. Pat. No. 3,475,318.

U.S. Pat. No. 3,475,318 discloses a process of removing bitumen from oil sands by solvent extraction with subsequent solvent recovery. After mixing the tar sands with a $C_5$ to $C_6$ hydrocarbon solvent in a dissolution zone whilst maintaining a solvent-to-bitumen weight ratio of from 0.5:1 to 1.5:1, the resultant mixture is passed to a classifier thereby obtaining an underflow of extracted sand. The extracted sand is passed through a counter-current extraction column and subsequently introduced in a first and second fluid-bed drying zone.

There is a continuous desire to improve the process efficiency in methods for extracting bitumen from an oil sand feed stream. It is an object of the present invention to meet this desire and to provide a more efficient method for extracting bitumen from an oil sand feed stream.

It is another object of the present invention to provide an alternative non-aqueous solvent based extraction process for extracting bitumen from an oil sand.

It is a further object of the present invention to efficiently separate solvent from the extracted sand.

It is an even further object of the present invention to provide a more efficient drying operation of the extracted sand, whilst reducing residual solvent levels in the sand to levels suitable for land reclamation.

SUMMARY OF THE INVENTION

One or more of the above or other objects are achieved according to the present invention by providing a method for extracting bitumen from an oil sand feed stream, the method comprising at least the steps of:
(a) providing an oil sand feed stream;
(b) contacting the oil sand feed stream with a liquid comprising an aliphatic hydrocarbon solvent thereby obtaining a solvent-diluted oil sand slurry;
(c) depositing the solvent-diluted oil sand slurry as a filter cake on a filter medium and filtering the solvent-diluted oil sand slurry thereby obtaining a solids-enriched stream and a filtrate, wherein during the filtering the pressure above the filter cake is at least 1.7 bara (i.e. 0.7 bar above atmospheric pressure); and
(d) lowering the pressure of the solids-enriched stream to below 1.2 bara.

It has now surprisingly been found according to the present invention that significantly reduced residual solvent levels can be obtained for the extracted sand (the solids-enriched stream obtained in step (d)) in a surprisingly simple and efficient manner.

According to the present invention, the providing of the oil sand feed stream can be done in various ways. Typically, before contacting the dry oil sand (which may contain some water being present in the oil sand) with the solvent, the oil sand particles are reduced in size, e.g. by crushing, breaking and/or grinding, to below a desired size upper limit. Experience in large scale operations shows that the achievable size upper limit for such size reduction is currently about 8 inch.

The contacting of the oil sand with the liquid comprising a solvent thereby obtaining a solvent-diluted oil sand slurry is not limited in any way. As an example, the liquid may be added before, during or after the size-reducing step (if available) of the oil sand. Further size reduction in the presence of the liquid (comprising the solvent) may be performed; part of the size reduction may take place by dissolution of bitumen present in the oil sand, but further size reduction e.g. by using screens and/or again crushers, breaker or grinders may be performed, if desired. Typically, the solvent forms the major part of the liquid and is preferably present in an amount of from 50 wt. % up to 100 wt. %, preferably above 60 wt. %, based on the amount of the liquid.

Although the solvent as used in the method of the present invention is not limited in anyway, it is typically a saturated or unsaturated aliphatic (i.e. non-aromatic) solvent and may include linear, branched or cyclic alkanes and alkenes and mixtures thereof. Preferably, the solvent in step (b) comprises an aliphatic hydrocarbon having from 3 to 9 carbon atoms per molecule, more preferably from 4 to 7 carbons per molecule, or a combination thereof. Especially suitable solvents are saturated aliphatic hydrocarbons such as propane, butane, pentane, hexane, heptane, octane and nonane (including isomers thereof), in particular butane, pentane, hexane and heptanes. Most preferably the solvent in step (b) comprises at least 90 wt. % of an aliphatic hydrocarbon having from 3 to 9 carbon atoms (preferably having 5 carbon atoms) per molecule, preferably at least 95 wt. %; preferably the aliphatic hydrocarbon is saturated (such as n-pentane and iso-pentane for the aliphatic hydrocarbon having 5 carbon atoms per molecule). Also, it is preferred that in step (b) substantially no aromatic solvent (such as toluene or benzene) is present, i.e. less than 5 wt. %, preferably less than 1 wt. %.

The particles of the solvent-diluted oil sand slurry obtained in step (b) may be screened or reduced in size to have a diameter below 5.0 cm, preferably below 3.0 cm, more preferably below 2.0 cm. As the screening or size reduction is performed in the presence of solvent (rather than size reduction under dry conditions), this helps breaking down the larger particles and dissolving the bitumen thereby avoiding the formation of sticky lumps. Additionally, by mixing the oil sand feed stream with the solvent before performing the filtering (in step (c)), the viscosity of the bitumen present in the oil sand is reduced, which leads to a (desired) increased filtration rate.

Typically, the solvent-diluted oil sand slurry has a solvent-to-bitumen (S/B) weight ratio of above 0.5, more typically above 0.7, and typically below 5.0, more typically below 4.0. Preferably, the solvent-diluted oil sand slurry has a solvent-to-bitumen (S/B) weight ratio of above 1.0, preferably from 1.2 to 5.0, more preferably from 1.4 to 3.0, even more preferably from 1.6 to 2.5. Further it is preferred that the solvent-diluted oil sand slurry obtained in step (b) comprises from 25 to 60 vol. % of solids, preferably from 32 to 60 vol. % of solids, more preferably from 35 to 50 vol. %, even more preferably from 40 to 48 vol. %.

After contacting the oil sand with the solvent in step (b), the solvent-diluted oil sand slurry is filtered in step (c), thereby obtaining a solids-enriched stream (containing the extracted sand) and a filtrate. This filtering step can be performed in many different ways. Typically, the solvent-diluted oil sand slurry is deposited as a filter cake on top of a filter medium, in a filtering unit. The filter medium can be varied in many ways, but is typically a wire mesh, cloth, membrane or the like. The major part of solids in the filter cake cannot pass through the filter medium, while liquids can. Fresh solvent and/or solvent vapour/liquid and/or inert gases (such as steam or $N_2$) may be passed through the filter cake by means of an applied pressure difference between the space above the top of the filter cake and the space below the filter medium. The filtrate that is obtained after passage through the filter medium may comprise some dispersed fine solids. The solids particles in the filter cake are left on top of the filter medium and removed from the filter for further processing.

Of course, the filtering in step (c) can be varied in many ways without departing from the scope of the invention. As an example, instead of one filtrate, two or more filtrates having different S/B weight ratios may be obtained. Although some fresh solvent may be used at the start-up of the process of the present invention, the addition of fresh solvent later on is preferably kept to a minimum; to this end it is preferred that most of the solvent used in the filtration step is recycled from downstream of the process.

As mentioned above the solvent-diluted oil sand slurry is filtered in step (c), whilst the pressure above the filter cake is at least 1.7 bara (i.e. the space in the filtration unit above the top of the filter cake has a pressure of above 1.7 bara).

According to an especially preferred embodiment of the present invention, this (over-)pressure above the filter cake during step (c) is provided by solvent vapour (which solvent vapour condenses in and passes through the filter cake during the filtering). The use of solvent vapour during the filtering of step (c) is very effective in washing bitumen from the filter cake, resulting in increased bitumen recovery. If desired, before applying the over-pressure on the filter cake, first a layer of liquid solvent may be applied to further assist the washing of the bitumen from the filter cake.

Preferably, during the filtering in step (c) the pressure above the filter cake is in the range of from 1.7 to 5.0 bara, preferably from 2.0 to 4.5 bara, more preferably from 2.2 to 4.3 bara, even more preferably from 2.4 to 4.0 bara.

In general it is preferred that during the filtering in step (c) the pressure difference over the filter cake is below 2.0 bar, preferably below 1.5 bar, more preferably below 1.0 bar and typically above 0.1 bar.

Typically, the solvent-diluted oil sand slurry has a temperature when deposited as a filter cake on the filter medium in step (c) of from 5 to 50° C., preferably from 7 40° C. If desired, the filter cake may be heated up before or during the filtering in step (c). In case an aliphatic hydrocarbon having 5 carbon atoms per molecules (such as iso-pentane or in particular n-pentane) is used as the solvent, it is preferred that the solvent-diluted oil sand slurry is filtered in step (c) at a temperature in the range of from 35° C. to 120° C., preferably from 40° C. to 100° C. Part of the heat may originate from the condensing solvent vapour (if any) used for creating the over-pressure. The person skilled in the art will understand that there may be a temperature gradient over the filter cake.

After the filtration of step (c), the pressure of the solids-enriched stream (i.e. the filter cake that is left on the filter medium once the filtering has taken place and is removed subsequently) is lowered to below 1.2 bar in step (d). Typically, the lowering of the pressure of the solids-enriched stream to below 1.2 bara takes place outside the filtering unit in a dedicated depressurizing unit. Such a depressurizing unit may be embodied in various ways and may comprise e.g. one or more batch-operated vessels, lock hoppers, rotary valves, etc.

Furthermore it is preferred that the solids-enriched stream is dried, thereby obtaining a dried solids-enriched stream typically containing less than 500 ppmw, preferably less than 300 ppmw, of the solvent. Typically, the dried solids-enriched stream further contains sand and possibly some remaining asphaltenes and bitumen which have not been extracted from the sand in the bitumen extracting process. The drying of the solids-enriched stream can be performed in many ways, such as by heating and/or lowering the pressure and/or purging an inert gas through the solids-enriched stream. Preferably, the solids-enriched stream is dried by lowering the pressure in step (d) to below 1.0 bara (i.e. below atmospheric pressure), preferably below 0.5 bara, more preferably below 0.3 bara, even more preferably below 0.1 bara and typically above 0.01 bara.

Also it is preferred that during the drying the solids-enriched stream is purged with an inert gas, preferably steam, a flue gas or $N_2$ or a mixture thereof.

According to an especially preferred embodiment of the method of the present invention solvent is removed from the filtrate thereby obtaining a bitumen-enriched stream. Typically the bitumen-enriched stream is further processed and for example sent to a refinery for upgrading. Preferably, at least part of the removed solvent is reused in the filtering of step (c). Typically, the solvent is removed from the filtrate as a vapour (e.g. by means of heating and/or distillation) and reused in step (c). If desired, the vapour may be pressurized before reusing in step (c). Preferably the solvent to be reused in step (c) has a pressure in the range of from 1.5 to 6 bara, preferably from 2.0 to 4.5 bara, and may be liquid, vaporous or partially condensed. The reuse of the solvent in the filtering of step (c) can serve multiple purposes. Firstly, the solvent can provide at least part of the over-pressure above the filter cake during the filtering step and thereby drive the majority of the solvent through the filter cake and filter medium. Secondly, if the solvent is in vaporous or partially condensed form, the solvent vapour may (further) condense in the filtering step resulting in additional washing of the filter cake and additional recovery of remaining bitumen in the oils sand. Thirdly, the (further) condensing vapour may also heat up the sand in the solids-enriched stream thereby assisting the removal of the solvent in a subsequent drying step (if any) of the solids-enriched stream. It goes without saying that the solvent as removed by the drying of the solids-enriched stream may be reused in the filtering of step (c) as well.

Further it is preferred that at least part of the filtrate is reused in the contacting of step (b).

According to an alternative embodiment of the method according to the present invention, the solvent-diluted oil sand slurry is thickened before the filtering in step (c), thereby obtaining a thickened solvent-diluted oil sand slurry and a solvent-enriched stream. The thickening may be performed in various ways, but is preferably performed in a settler or other solid/liquid separator. Preferably, solvent is removed from the solvent-enriched stream thereby obtaining a bitumen-enriched stream. The bitumen-enriched stream may be further upgraded and e.g. sent to a refinery, whilst the recovered solvent may be reused, e.g. in the contacting of step (b) and/or the filtering of step (c).

BRIEF DESCRIPTION OF THE DRAWINGS

Hereinafter the invention will be further illustrated by the following non-limiting drawings. Herein shows:

FIG. 3 schematically a filtering unit that may be used in the method according to the present invention.

DETAILED DESCRIPTION OF THE PREFERRED EMBODIMENTS

For the purpose of this description, a single reference number will be assigned to a line as well as a stream carried in that line.

Figure 1:
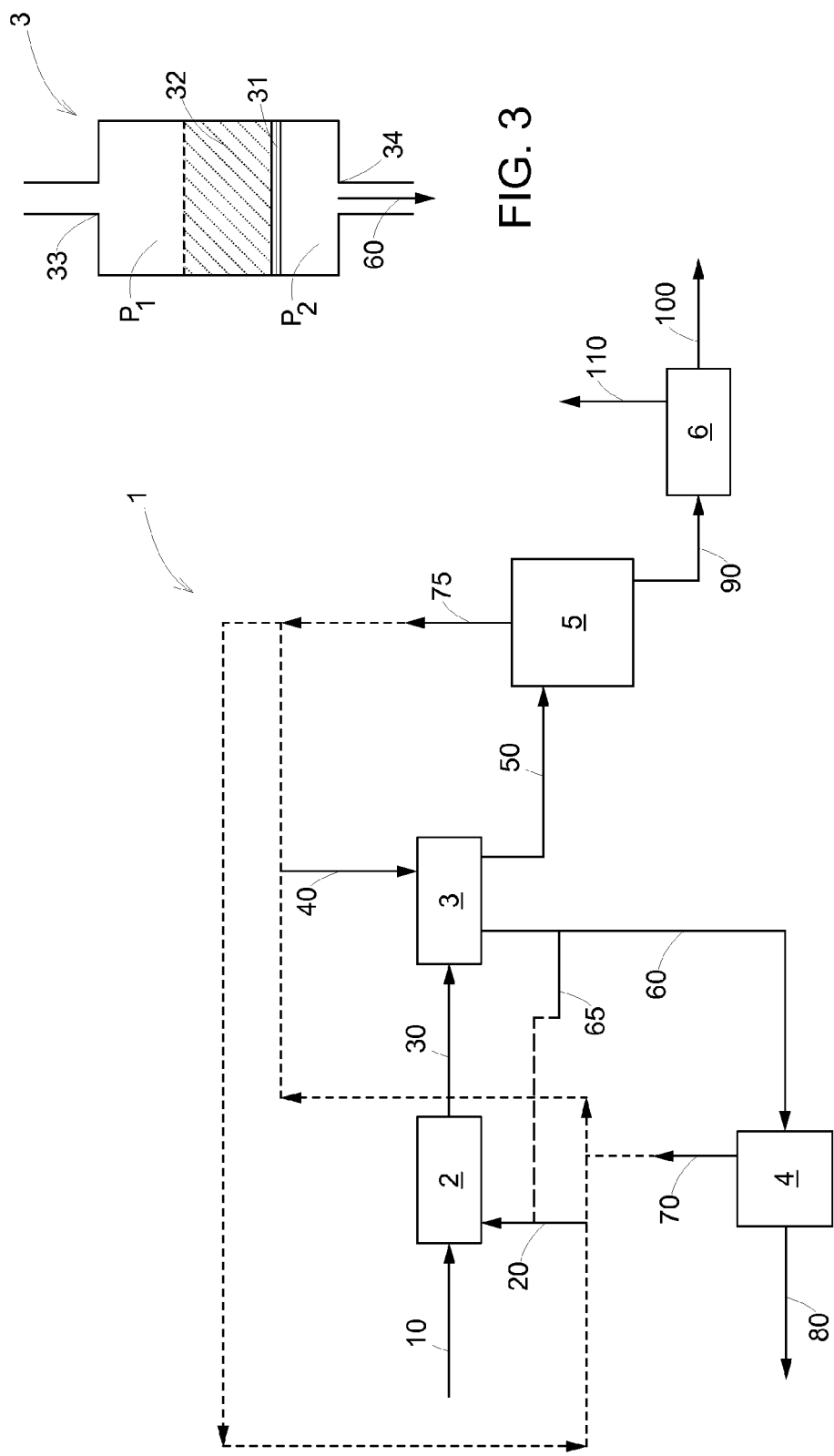
FIG. 1 schematically a process scheme of the method in accordance with the present invention.

FIG. 1 schematically shows a simplified process scheme according to the present invention for extracting bitumen (i.e. in the context of the invention a bituminous and/or extremely heavy crude oil like material) from an oil sand feed stream. The process scheme is generally referred to with reference numeral 1. The process scheme 1 shows a mixer 2, a filter (or filtering unit) 3, a first separator 4, a (depressurized) second separator 5 and a dryer 6.

During use of the process scheme of FIG. 1, an oil sand feed stream 10 is provided and fed to the mixer 2. Typically, before entering the mixer 2, the dry oil sand feed stream 10 has been crushed or treated otherwise, to reduce the size of the larger oil sand lumps to below a pre-determined upper limit. Experience in large scale operations shows that the achievable size upper limit for such size reduction is currently about 8 inch. Further size reduction of the dry oil sand feed stream 10 by mechanical means usually results in blockage due to the sticky, viscous nature of the oil sand. Further size reduction may take place once solvent used for the bitumen extraction has been added.

In the mixer 2, the dry oil sand feed stream 10 is mixed with solvent stream 20 (containing an aliphatic hydrocarbon solvent) thereby obtaining a solvent-diluted oil sand slurry 30. The solvent stream 20 may have been recycled from downstream of the process (and as a consequence contain some bitumen), e.g. as stream 70 recovered in the first separator 4 from the filtrate 60 as obtained in the filter 3 or as stream 75 as recovered in the second separator 5 from the solids-enriched stream 50, and/or as stream 110 from dryer 6.

Figure 2:
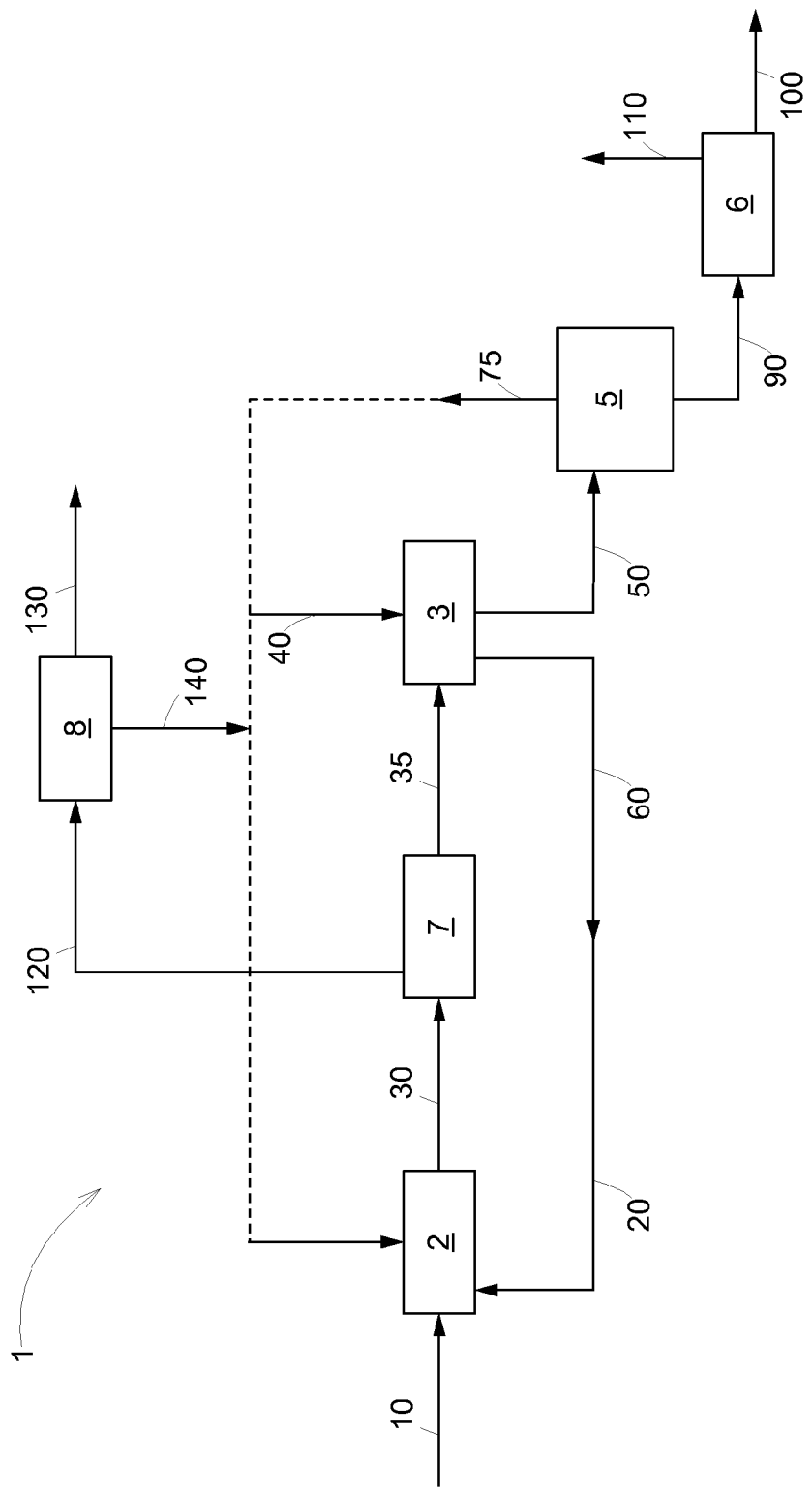
FIG. 2 schematically an alternative process scheme of the method in accordance with the present invention.

The slurry stream 30 exiting the mixer 2 is fed directly (unlike the embodiment as shown in FIG. 2) to the filter 3 for filtration. The filtering step in filter 3 can be performed in many different ways. Typically, the solvent-diluted oil sand slurry 30 is deposited as a filter cake 32 on top of a filter medium 31 in the filter 3 (see FIG. 3). The major part of solids in the filter cake cannot pass through the filter medium 31, while liquids can. Fresh solvent and/or solvent vapour/liquid and/or other inert gases (such as steam or $N_2$) may be passed through the filter cake 32 by means of an applied pressure difference between the space above the top of the filter cake 32 and the space below the filter medium 31. The filtrate 60 that is obtained after passage through the filter medium 31 may comprise some dispersed fine solids. The solids particles in the filter cake 32 are left on top of the filter medium 31 and removed from the filter 3 for further processing as stream 50.

In the embodiment of FIG. 1, in filter 3 a wash solvent 40 is used. The wash solvent 40 has been recycled from a point downstream in the process, e.g. from the first separator 4 (shown as stream 70) or the second separator 5 (shown as stream 75); of course, some additional fresh wash solvent (not shown) may be added as well.

In the filter 3, the solvent-diluted oil sand slurry is filtered at a pressure (for the space above the filter cake 32) of at least 1.7 bara, thereby obtaining a solids-enriched stream (being the filter cake 32 as removed from the filter medium 31) 50 and a filtrate 60.

In the embodiment of FIG. 1, the (bitumen-enriched) filtrate 60 is sent to the first separator 4. If desired, the filtrate 60 may first be sent to a settler (not shown) or the like to remove any remaining solid particles and fines before entering the first separator 4. Also, as indicated, at least a part 65 of the filtrate 60 may be reused in the mixer 2. In the first separator 4, solvent 70 (typically as vapour) is separated from the filtrate 60 thereby obtaining a bitumen-enriched stream 80. The bitumen-enriched stream 80 may be sent to a refinery (not shown) for further processing. The solvent stream 70 may be recycled to the filter 3 (for re-use as a wash solvent 40 during the filtration step) and/or the mixer 2 (as stream 20). In case the solvent stream 70 is used as vaporous wash solvent in filter 3, at least part (or all) of the vaporous part of solvent stream 70 is condensed in the filter 3 thereby heating up the solvent-diluted oil sand slurry being filtered. As a result the bitumen-depleted sand stream 50 is increased in temperature as well, thereby making a subsequent drying step (if any) of the bitumen-depleted sand 50 more efficient.

The (bitumen-depleted) solids-enriched stream 50 is usually used for land reclamation; to this end removal of solvent from the solids-enriched stream 50 is performed in second separator 5 by lowering the pressure thereof (to below 1.2 bara) thereby obtaining a solvent stream 75 which can be recycled to filter 3 (and/or mixer 2) and a dried solids-enriched stream 90. If needed, stream 90 may be further dried in dryer 6 obtaining dried solids-enriched stream 100 and a solvent stream 110 (which may be reused in the process).

FIG. 2 shows an alternative embodiment of the method according to the present invention. In FIG. 2, a settler (or other solid/liquid separator) 7 is placed between the mixer 2 and filter 3. The settler 7 receives the solvent-diluted oil sand slurry 30 from the mixer 2 and separates it into a thickened solvent-diluted oil sand slurry 35 (which is sent to the filter 3) and a settler overflow 120 which is sent (after optionally removing "fines" in a further solid/liquid separator such as a settler or the like) to a separator 8. In the separator 8, the settler overflow 120 is separated into a bitumen-enriched stream 130 and a recovered solvent stream 140. The bitumen-enriched stream 130 may be sent to a refinery (not shown) for further processing. The recovered solvent stream 140 may be reused, e.g. in the mixer 2 and/or the filter 3 (if desired, after combining with stream 75 from the second separator 5. The filtrate 60 as obtained in the filter 3 is reused in the mixer 2 as stream 20. Further stream 75 as obtained in the second separator 5 may be reused, e.g. in the mixer 2 and/or filter 3.

FIG. 3 schematically shows a filtering unit 3 that may be used in the method according to the present invention. The filtering unit 3 comprises an inlet 33, an outlet 34, a filter medium 31 and a filter cake 32. "$p_1$" and "$p_2$" indicate the pressure above and below the filter cake 32 during the filtering. The filter medium 31 may be varied widely and may e.g. be a wire mesh, cloth, membrane or the like to support the filter cake 32. The filter cake 32 is formed by depositing the (optionally thickened) solvent-diluted oil sand slurry 30,35 on the filter medium 31. After the filtering in the filtering unit 3 has taken place (whilst removing filtrate 60 via outlet 34), the filter cake 32 is removed from the filter medium 31 and sent as stream 50 to the separator 5.

The person skilled in the art will readily understand that many modifications may be made without departing from the scope of the invention.

The present invention is described below with reference to the following Example, which is not intended to limit the scope of the present invention in any way.

Example 1

A 450 g sample of an Athabasca oil sand (having a bitumen content of 11.9 wt %, the particles having a diameter below 5.0 cm) and an amount ("$M_1$") of 95 g solvent (n-pentane) were mixed in a glass bottle for 30 minutes under ambient conditions using a tumbler bank (Reax 20, obtainable from Heidolph (Schwabach, Germany); 15 rpm setting) to form a slurry with a S/B weight ratio of about 1.8. The slurry was then transferred into an enclosed glass settle tube and allowed to settle for 5 min. Supernatant liquid that formed above the sand was decanted. The remaining slurry was homogenized and then transferred into a closed filtration unit with a wall temperature of 10° C. and allowed to settle on top of a filter medium, and the surface of the filter cake levelled (height of the filter cake was about 15 cm).

The filtration unit had three sections: a solvent vapour generator section, a temperature-controlled glass wall filtration section (having a filtration area of 50 mm) and a condenser section to condense and collect the filtrate.

Any supernatant liquid still present on top of the settled filter cake was first drained through the filter cake, until only a thin (1 mm) layer of supernatant liquid remained. This liquid was collected inside a glass condenser and cooled to −18° C. to avoid excessive evaporation of pentane vapour. The pressure underneath the filter cake and inside the condenser was adjusted to a pre-selected pressure "$p_2$" of 2.8 bara. An amount ("$M_2$") of 120 g fresh liquid wash solvent was then placed on top of the filter cake. The wall temperature of the filter reactor was increased to mimic adiabatic conditions, and a pentane vapour supply was opened, establishing a vapour pressure "$p_1$" bara of 3.4 above the filter cake. Due to the achieved pressure difference over the filter cake, the fresh wash solvent on top of the filter cake was pushed through the filter cake. The moment the solvent vapour front reached the bottom of the filter cake, the filter cake temperature rose, to a filter breakthrough temperature "$T_1$" of 63° C. and the pentane vapour supply was closed. The total time from start of the filtration to the filter breakthrough time was recorded as "$t_1$", being 58 sec. The filtrate was collected in the condenser and chilled to −18° C. The filter cake was then depressurized by reducing the pressure via the condenser to atmospheric pressure (i.e. 1.0 bara). The bottom temperature of the filter cake dropped in that step to temperature "$T_2$", being 42° C. Simultaneously, the reactor was instantaneously cooled to 10° C., again to mimic adiabatic conditions (i.e. avoiding external heat input). The pentane vapour coming from the filter cake during depressurizing was condensed and collected inside the condenser. The accumulated filtrate was drained from the condenser. After cooling down, the filtration unit was opened and the total filter cake was—in order to measure the residual pentane in the filter cake—put into a glass bottle containing 182 g p-xylene and 1.74 g tetradecane as internal standard. This was mixed for 2 hours under ambient conditions using a tumbler bank (Reax 20, obtainable from Heidolph (Schwabach, Germany); 15 rpm setting. The solids were allowed to settle. A small liquid sample was taken from the top supernatant liquid and injected into a GC apparatus (Agilent, Column DB-1, 60M×0.32 mm, DF 0.5 μM; GC-conditions: 40° C. for 1 minute, 1° C./min to 50° C., hold 1 minute, 50° C. to 300° C., hold 3 minutes. The liner of the GC-apparatus was equipped with silica filter to remove bitumen 325° C. detector, 2.6 nl/min column flow (He), 100:1 split ratio, 1 μl injection.) from which the residual pentane concentration "$M_{res}$" (in wt. % on sand) was determined.

Table 1 shows the various conditions during the filtration, as well as the amount of residual pentane "$M_{res}$" in the filter cake.

Examples 2 and 3

The procedure of Example 1 was repeated, whilst varying the pressure above and underneath the filter cake. The various conditions, as well as the amount of residual pentane "$M_{res}$" in the filter cake, are given in Table 1.

Comparative Example 1

The procedure of Example 1 was repeated, whilst applying a pressure of below 1.5 bar above the filter cake. The various conditions, as well as the amount of residual pentane "$M_{res}$" in the filter cake, are given in Table 1.

TABLE 1

|  | Example 1 | Example 2 | Example 3 | Comp. Ex. 1 |
|---|---|---|---|---|
| $p_1$ [bara] | 3.4 | 2.7 | 2.4 | 1.48 |
| $p_2$ [bara] | 2.8 | 2.5 | 1.2 | 1.0 |
| $T_1$ [° C.] | 63 | 63 | 67 | 36 |
| $T_2$ [° C.] | 42 | 44 | 51 | 35 |
| $t_1$ [s] | 58 | 52 | 91 | 30 |
| $M_{res}$ [wt. %] | 0.33 | 0.66 | 0.43 | 2.59 |

Discussion

As can be learned from Table 1, the method according to the present invention provides a process suitable for obtaining significantly reduced residual solvent levels for the extracted sand (the filter cake), by maintaining the filter pressure ($p_1$) above the filter cake at least 1.7 bara. As can be seen from comparing Examples 1-3 according to the present invention with Comparative Example 1, a significantly higher residual solvent level was observed for Comparative Example 1.

Further it is noted that the method according to the present invention also allows for recovering the majority (more than 90%) of the maltenes present in the oil sand.

We claim:

1. A method for extracting bitumen from an oil sand feed stream, the method comprising at least the steps of:
    (a) providing an oil sand feed stream;
    (b) contacting the oil sand feed stream with a liquid comprising an aliphatic hydrocarbon solvent thereby obtaining a solvent-diluted oil sand slurry;
    (c) depositing the solvent-diluted oil sand slurry as a filter cake on a filter medium and filtering the solvent-diluted oil sand slurry, thereby obtaining a solids-enriched stream and a filtrate, wherein during the filtering the pressure above the filter cake is at least 1.7 bara; and
    (d) lowering the pressure of the solids-enriched stream to below 1.2 bara.

2. The method according to claim 1, wherein the solvent comprises an aliphatic hydrocarbon having from 3 to 9 carbon atoms per molecule, or a combination thereof.

3. The method according to claim 2, wherein the solvent comprises at least 90 wt. % of an aliphatic hydrocarbon having 5 carbon atoms per molecule.

4. The method according to claim 2 wherein the aliphatic hydrocarbon has from 4 to 7 carbon atoms per molecule.

5. The method according to claim 1 wherein the solvent-diluted oil sand slurry has a solvent-to-bitumen (S/B) weight ratio of above 1.0.

6. The method according to claim 1 wherein the pressure above the filter cake of at least 1.7 bara in step (c) is provided by solvent vapour.

7. The method according to claim 1 wherein during the filtering in step (c) the pressure above the filter cake is in the range of from 1.7 to 5.0 bara.

8. The method according to claim 1 wherein during the filtering in step (c) the pressure difference over the filter cake is below 2.0 bar.

9. The method according to claim 1 wherein the solvent-diluted oil sand slurry is filtered in step (c) at a temperature in the range of from 35° C. to 120° C.

10. The method according to claim 1 wherein the solids-enriched stream is dried, thereby obtaining a dried solids-enriched stream.

11. The method according to claim 10, wherein the solids-enriched stream is dried by lowering the pressure in step (d) to below 1.0 bara.

12. The method according to claim 1 wherein solvent is removed from the filtrate thereby obtaining a bitumen-enriched stream.

13. The method according to claim 12, wherein at least part of the removed solvent is reused in the filtering of step (c).

14. The method according to claim 1 wherein at least part of the filtrate is reused in the contacting of step (b).

15. The method according to claim 1 wherein the solvent-diluted oil sand slurry is thickened before the filtering in step (c), thereby obtaining a thickened solvent-diluted oil sand slurry and a solvent-enriched stream and the thickened solvent-diluted oil sand slurry is deposited on the filter medium in step (c).

16. The method according to claim 15, wherein solvent is removed from the solvent-enriched stream thereby obtaining a bitumen-enriched stream.

17. The method of claim 1 wherein the oils sand slurry contains between 40 and 48 percent by volume solids.

* * * * *